United States Patent [19]
Peirce, Jr.

[11] 3,858,849
[45] Jan. 7, 1975

[54] PULL LINE FEEDER
[76] Inventor: Benjamin F. Peirce, Jr., 1040 S.W. 67th Ter., Plantation, Fla. 33317
[22] Filed: Feb. 19, 1974
[21] Appl. No.: 443,295

[52] U.S. Cl...... 254/134.3 R, 242/129.62, 242/130, 242/141
[51] Int. Cl............................................. E21c 29/16
[58] Field of Search ............ 254/134.3 R, 134.3 FT; 242/129, 129.5, 130, 141, 129.62

[56] References Cited
UNITED STATES PATENTS

| | | | |
|---|---|---|---|
| 911,664 | 2/1909 | Locke | 242/129.62 |
| 1,387,299 | 8/1921 | Oliver | 242/129.62 |
| 2,221,903 | 11/1940 | Abramson et al. | 254/134.3 R |
| 3,072,382 | 1/1963 | Jones | 254/134.3 R |
| 3,072,383 | 1/1963 | Vanderhagen | 254/134.3 R |

FOREIGN PATENTS OR APPLICATIONS
4,691  4/1886  Great Britain ................ 242/129.62

*Primary Examiner*—Othell M. Simpson
*Attorney, Agent, or Firm*—Oltman and Flynn

[57] ABSTRACT

An apparatus for feeding into a wiring conduit in a building one or more pull lines that will be used to pull the wires or cables for individual points of use in the building out to a wiring terminal for the building. The apparatus has a U-shaped frame with a T fitting at the bottom and a cross bar at the top for supporting one or more supply rolls of the pull line. This frame may be mounted on a support base or it may be mounted on a conduit that is part of the wiring conduit system in the building.

6 Claims, 3 Drawing Figures

PATENTED JAN 7 1975  3,858,849

PULL LINE FEEDER

BACKGROUND OF THE INVENTION

In my co-pending U. S. patent application, Ser. No. 442,925, entitled "WIRING ARRANGEMENT," and filed concurrently herewith, I have disclosed a unitary wiring conduit system for installation in buildings under construction, such as apartment buildings or town houses, in which there are a multiplicity of individual points of use, such as telephone stations, at different locations in the building. This system includes a branch conduit for each individual telephone station or other point of use and a main conduit leading from all the branch conduits to a single telephone or other wiring terminal for the entire building or a section of it. A service wire for each individual station or point of use must be fed through the conduit system to this terminal. First, a flexible waxed cord line is passed through the main conduit, and then this line is pulled into each of the several branch conduits for the individual staions or points of use. Next, the wires or cables for all the individual stations or points of use are attached to this line at the branch conduits. then, the line is pulled out at the building terminal, and it pulls all of the individual station wires or cables through their respective branch conduits and simultaneously through the main conduit for connection at the building terminal.

SUMMARY OF THE INVENTION

The present invention is directed to a novel apparatus for feeding such a pull line into the wiring conduit system for use in the manner just described.

Preferably, this apparatus comprises a generally U-shaped frame and a cross bar extending across the top of the frame and carrying one or more pull line supply rolls. A T fitting at the bottom of the frame is attachable either to a support base or to a conduit that is part of the wiring conduit system in the building. This T fitting has a top opening for passing the line directly into the conduit when the apparatus is used in that mode. The U-shaped frame, including the T fitting at the bottom, is hollow and pressurized air can be applied to it to move the pull line through the wiring conduit system.

A principal object of this invention is to provide a novel and improved apparatus for feeding a flexible pull line or lines into a wiring conduit system in a building for subsequent use in pulling the individual station wires or cables through the conduit system to a terminal serving all of these individual stations.

Further objects and advantages of this invention will be apparent from the following detailed description of two presently-preferred embodiments, which are illustrated in the accompanying drawing in which.

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Figure 1:
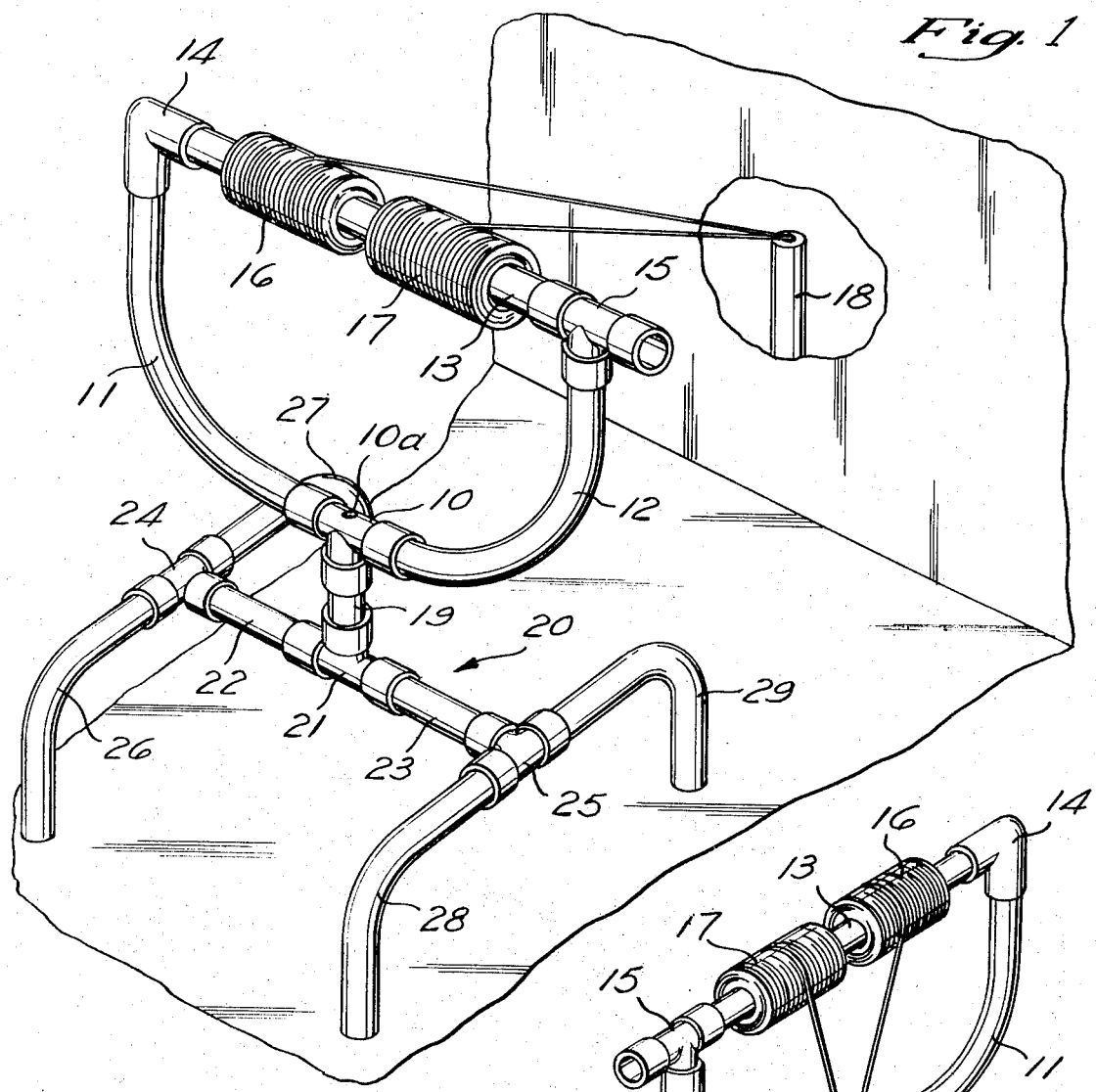
FIG. 1 is a perspective view of a first embodiment of the present apparatus.

Referring first to the embodiment shown in FIG. 1, the present apparatus comprises a generally U-shaped support including a T fitting 10 and a pair of outwardly and upwardly curved arms 11 and 12 extending up on opposite sides of the fitting. A horizontal cross bar 13 extends between the upper ends of the opposite arms 11, 12 of the U-shaped support. At the left end this cross bar is connected to the upper end of arm 11 by a right-angled elbow 14. At the right end it is connected to the upper end of arm 12 by a T fitting 15. Preferably, all of the elements thus far described are cylindrical in cross-section and are made from a suitable plastic, such as polyvinyl chloride. The T fitting 10 at the bottom of the U-shaped support has a top opening 10a that leads down into the hollow interior of this fitting.

The cross bar 13 is shown as supporting two supply rolls 16, 17 or suitable waxed cord. It is to be understood that a single supply roll, or more than two, may be provided. Each of these supply rolls has a central cylindrical core around which the cord line is wound, and this core is freely rotatable on the cross bar. The respective cord lines extend from the supply rolls over into the upper end of a vertical conduit 18 that is at one end of the wiring conduit system in the building. This system has a main conduit extending from the location of a terminal to a multiplicity of individual stations or points of use at different locations in the building and all served by that terminal. At each of these stations a branch conduit is joined to the main conduit. The conduit 18 may be at the terminal or it may be the branch conduit at the opposite end of the main conduit from the terminal. Preferably, it is the former.

The T fitting 10 at the bottom of the U-shaped support is snugly but rotatably mounted on the upper end of a cylindrical, upstanding post 19 that extends up from a base 20 which supports the U-shaped frame 10–12 from the floor or another horizontal support surface. The lower end of post 19 has a snug but rotatable fit in a T fitting 21 in this support base whose opposite ends are joined to outwardly extending, horizontal tubular pieces 22 and 23. The outer ends of these pieces are joined to respective T fittings 24 and 25, which are supported from below by respective pairs of floor-engaging, curved, tubular legs 26, 27 and 28, 29.

Figure 3:
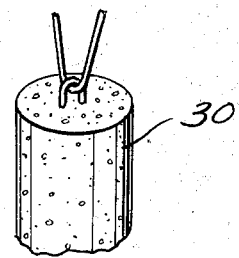
FIG. 3 is a perspective view showing a cylindrical body which is slidable through the wiring conduit system, under the influence of an applied air pressure differential, to pull one or more lines from the present appparatus through the conduit system.

In the use of this apparatus, the free ends of the lines coming off the supply rolls 16 and 17 are both connected to a cylindrical body 30 (FIG. 3) of polyurethane foam or the like that has a sliding fit inside the main conduit. All of the branch conduits at the individual stations or points of use in the building are closed except the one farthest away from the building terminal along the main conduit. Vacuum may be applied to this last-mentioned branch conduit to draw the polyurethane foam body from the building terminal location at 18 through the entire length of the main conduit until it reaches this branch conduit, pulling with it the attached lines. With these lines now extending along the entire length of the main conduit, they are pulled with a hook up into each branch conduit and the service wire for that station is suitably attached to the lines there. After all have been attached, the lines may be pulled back toward the terminal for the building (at 18 in FIG. 1) and they pull with them the individual wires or cables for the several individual stations or points of use in the building, so that the ends of these wires or cables may be connected to the terminal.

The pivotal connections of the T fitting 10 and 21 at each end of the post 19 enable the selective angular adjustment of the cross bar 13 over a 360° range in a horizontal plane to facilitate the use of this line feeder at hard-to-reach or awkward locations.

Figure 2:
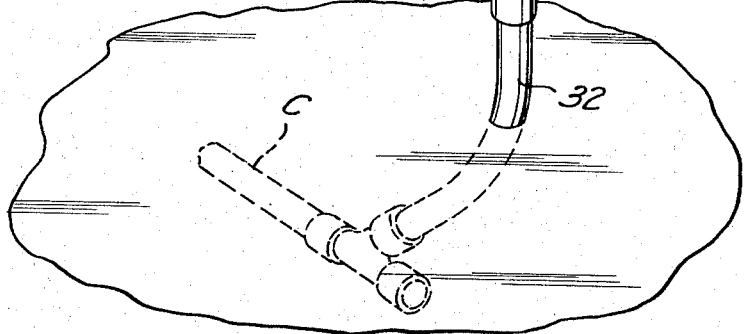
FIG. 2 is a similar view of a second embodiment of this apparatus.

FIG. 2 shows a second embodiment of the present line feeder, corresponding elements of which are given the same reference numerals as in FIG. 1.

In this embodiment the post 19 extending down from the T-fitting 10 at the bottom of the U-shaped support 10–12 is mounted directly on the upper end of an upstanding conduit 32 whose lower end is connected to the main conduit C. This upstanding conduit 32 may be at the wiring terminal for the building or it may be the branch conduit at the individual station that is most remote from that terminal along the main conduit.

In the use of the FIG. 2 device, the lines extend down from the supply rolls 16 and 17 directly through the top opening 10a in the T fitting 10, and their lower ends are attached to the cylindrical body 30 so that the latter's movement along the main conduit to the opposite end pulls the lines with it.

Such movement may be effected by applying vacuum to the opposite end of the main conduit as already described.

Alternatively, such movement may be effected by applying pressurized air from an air compressor to the end fitting 15. The pressurized air flows down through the hollow interior of the U-shaped support 10–12 and the cross bar 13 and, even with some leakage at the top opening 10a in the T fitting 10, it exerts sufficient above-atmospheric pressure against the cylindrical body 30 to move the latter through the entire length of the main conduit, pulling with it the lines coming off the supply rolls 16 and 17.

Obviously, if desired, a combination of air pressure at the inlet end and vacuum at the remote end may be used to cause the described movement of the cylindrical body 30 to pull the lines through the main conduit from one end to the other.

I claim:

1. A line feeder for feeding one or more flexible lines into a wiring conduit comprising a generally U-shaped support having a fitting at the bottom and a pair of spaced apart arms extending up from said fitting on opposite sides, and a cross bar extending substantially horizontally between the upper ends of said arms, said support having an opening therein and a passage extending from said opening adapted to pass one or more flexible lines unwound from corresponding supply rolls on said cross bar.

2. A line feeder according to claim 1, and further comprising a support base engaging and supporting said fitting from below.

3. A line feeder according to claim 2, and further comprising means providing a vertical pivot between said generally U-shaped support and said base for the selective pivotal adjustment of said support and said cross bar horizontally through 360° about said pivot.

4. A line feeder according to claim 1, wherein said opening is in said fitting, and said passage extends down from said opening through said fitting.

5. A line feeder according to claim 4, wherein said fitting is attachable at its lower end to the upper end of the conduit, with said passage in the fitting registering with the interior of the conduit to pass the line down into the latter, and one of said arms in said U-shaped support has a passageway communicating at its lower end with said passage in the fitting and open at its upper end for the attachment of a source of pressurized air.

6. A line feeder according to claim 5 wherein said opening is in the top of said fitting.

* * * * *